United States Patent
Karmakar et al.

(10) Patent No.: US 10,678,769 B2
(45) Date of Patent: Jun. 9, 2020

(54) ARTIFICIAL INTELLIGENCE SYSTEM AND METHOD FOR AUTO-NAMING CUSTOMER TREE NODES IN A DATA STRUCTURE

(71) Applicant: Walmart Apollo, LLC, Bentonville, AR (US)

(72) Inventors: Somedip Karmakar, Kolkata (IN); Amlan Jyoti Das, Karnataka (IN); Aloka Sudhodanan, Palakkad (IN)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/533,091

(22) Filed: Aug. 6, 2019

(65) Prior Publication Data

US 2020/0042508 A1 Feb. 6, 2020

Related U.S. Application Data

(60) Provisional application No. 62/773,553, filed on Nov. 30, 2018.

(30) Foreign Application Priority Data

Aug. 6, 2018 (IN) .............................. 201811029547

(51) Int. Cl.
*G06F 16/00* (2019.01)
*G06F 16/22* (2019.01)
(Continued)

(52) U.S. Cl.
CPC ...... *G06F 16/2272* (2019.01); *G06F 16/2246* (2019.01); *G06F 16/2379* (2019.01); *G06N 20/00* (2019.01); *G06Q 30/0202* (2013.01)

(58) Field of Classification Search
CPC .......................... G06F 16/2246; G06F 16/2272
See application file for complete search history.

(56) References Cited

U.S. PATENT DOCUMENTS 5,794,178 A    8/1998   Caid et al.
8,316,019 B1   11/2012   Ainslie et al.
(Continued)

OTHER PUBLICATIONS

International Search Report and Written Opinion dated Oct. 21, 2019 in International Application No. PCT/US2019/045310.
(Continued)

*Primary Examiner* — Grace Park
(74) *Attorney, Agent, or Firm* — Venable LLP; Jeffri A. Kaminski (57) ABSTRACT

Systems and methods for auto-naming nodes in a behavior tree are provided. An example method can include: providing a hierarchy of tree nodes by a computing device; generating a first corpus for each node at a final level; creating a first term-document matrix associated with the first corpus; identifying a first group of high-frequency words in the first term-document matrix; removing the first group of the high-frequency words obtain a second corpus; creating a second term-document matrix based on each of a set of predefined rules; identifying a second group of high-frequency words to represent node names; selecting a best set of the predefined rules based on an automatic evaluation model; generating a node name by removing a duplicate word in each node; incorporating feedback to generate a predicted name for each node; and selecting a final name for each node from the predicted name and the generated node name.

20 Claims, 8 Drawing Sheets

(51) Int. Cl.
    *G06Q 30/02*   (2012.01)
    *G06N 20/00*   (2019.01)
    *G06F 16/23*   (2019.01)

(56) References Cited

U.S. PATENT DOCUMENTS

| | | |
|---|---|---|
| 8,412,656 B1 | 12/2013 | Tiwari et al. |
| 9,424,298 B2 | 8/2016 | Bufe et al. |
| 9,785,630 B2 | 10/2017 | Willmore et al. |
| 2011/0255788 A1 | 10/2011 | Duggan et al. |
| 2013/0346352 A1 | 12/2013 | Tiwari et al. |
| 2015/0066711 A1 | 3/2015 | Chua et al. |
| 2015/0106156 A1 | 4/2015 | Chang et al. |
| 2015/0269138 A1 | 9/2015 | Parris et al. |
| 2015/0347383 A1 | 12/2015 | Willmore et al. |
| 2017/0255536 A1 | 9/2017 | Weissinger et al. |
| 2019/0205806 A1 | 7/2019 | Karmakar et al. |

OTHER PUBLICATIONS

Fokin et al., "Constructing decision trees for user behavior prediction in the online consumer market", First Cycle, Stockholm, Sweden 2016, retrieved Nov. 12, 2019 from http://diva-portal.org/smash/get/diva2:927446/FULLTEXT01.pdf.

| Given Name | N-gram frequency | Common Themes | Word Vector |
|---|---|---|---|
| Puppy | formula toplife | boy choc drops asda | chick denta asda chickn |
| Value Dry | complete wagg asda | asda chicken complete wagn asda | meaty chickn asda chick asda |
| Branded Treats | misfits small rodeo schmackos not own dog single pack | schmackos dentastix light meaty not own dog single pack | bites chick medium sticks not own dog single pack |

ARTIFICIAL INTELLIGENCE SYSTEM AND METHOD FOR AUTO-NAMING CUSTOMER TREE NODES IN A DATA STRUCTURE

CROSS-REFERENCE TO RELATED APPLICATIONS

This patent application claims the priority to Indian Provisional Application No. 201811029547, filed Aug. 6, 2018, and U.S. Provisional Application No. 62/773,553, filed Nov. 30, 2018, contents of which are incorporated by reference herein.

BACKGROUND

1. Technical Field

The present disclosure relates to artificial intelligence systems and methods of auto-naming tree nodes in a data structure.

2. Introduction

A customer behavior tree (CBT) is a graphical record of a hierarchy of items which can reflect purchase decisions made by a customer when shopping items in a category in a retail store. The customer behavior tree is used to group the items based on customer purchase patterns. The CBT creates a customized product hierarchy that can help retailers and manufacturers to perform modular planning and evaluate a layout of the category. The customer behavior tree may also be used in store localization and item assortment decisions. However, the groups of items may not always be aligned to any predefined merchandising hierarchy. Certain different types of products may come together in one group.

There is a need to use machine learning techniques to identify and properly name the CBT nodes in a data hierarchy. Therefore, items in the category may be optimally categorized to be displayed on store shelves or on a retailer's website in order to increase customer satisfaction and improve a cross-selling of similar items in the category.

SUMMARY

An example computer-implemented method of performing concepts disclosed herein can include: providing, by a computing device, a hierarchy of nodes at a plurality of levels of the CBT; generating, by a processor, a first corpus comprising product description of all items in a category and product attributes for each node of a final level of the CBT; creating, based on the first corpus, a first term-document matrix associated with each word in the first corpus and a frequency that the word appears in the first corpus; identifying a first group of high-frequency words in the first term-document matrix; removing the first group of the high-frequency words from the first corpus to obtain a second corpus; creating a second term-document matrix associated with the second corpus based on each of a set of predefined rules, a value of the second term-document matrix being defined as a data set to represent a number of times each word appears in the second corpus, the set of the predefined rules comprising at least one of an n-gram frequency model, a common themes topic model, an overlapping topic model, a word vector representation model, and a full text approach model; identifying, based on a data set of the second term-document matrix, a second group of high-frequency words to represent node names such that the second group of the high-frequency words satisfy a predefined frequency cut-off threshold; selecting, by the processor, a best set of the predefined rules based on an automatic evaluation model; generating a node name associated with the second group of the high-frequency words by removing a duplicate word in each node, using the best set of the predefined rules and based on a frequency ratio of each word in each node to all the nodes; incorporating feedback associated with other nodes in the category to generate a predicted name for each node; and selecting a final name for each node from the predicted name and the generated node name associated with the second group of the high-frequency words.

An example system configured according to the concepts and principles disclosed herein can include: a processor of a computing device; and a computer program product comprising a non-transitory computer-readable storage medium having instructions stored which, when executed by the processor, cause the processor to perform operations comprising: providing, by a computing device, a hierarchy of nodes at a plurality of levels of the CBT; generating, by a processor, a first corpus comprising product description of all items in a category and product attributes for each node of a final level of the CBT; creating, based on the first corpus, a first term-document matrix associated with each word in the first corpus and a frequency that the word appears in the first corpus; identifying a first group of high-frequency words in the first term-document matrix; removing the first group of the high-frequency words from the first corpus to obtain a second corpus; creating a second term-document matrix associated with the second corpus based on each of a set of predefined rules, a value of the second term-document matrix being defined as a data set to represent a number of times each word appears in the second corpus, the set of the predefined rules comprising at least one of an n-gram frequency model, a common themes topic model, an overlapping topic model, a word vector representation model, and a full text approach model; identifying, based on a data set of the second term-document matrix, a second group of high-frequency words to represent node names such that the second group of the high-frequency words satisfy a predefined frequency cut-off threshold; selecting, by the processor, a best set of the predefined rules based on an automatic evaluation model; generating a node name associated with the second group of the high-frequency words by removing a duplicate word in each node, using the best set of the predefined rules and based on a frequency ratio of each word in each node to all the nodes; incorporating feedback associated with other nodes in the category to generate a predicted name for each node; and selecting a final name for each node from the predicted name and the generated node name associated with the second group of the high-frequency words.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to artificial intelligence systems and methods of auto-naming tree nodes of a particular type of data structure, such as a customer behavior tree (CBT). The concepts disclosed herein can be equally applicable to other types of data structures. A tree may include hierarchical grouping of similar items. The similar items may be purchased by customers in similar context such as attributes, product association, substitution and basket metrics, etc. The CBT creates a customized product hierarchy with similar products together from a customer perspective. The customer behavioral tree has a tree like structure including a root node and child nodes. A dendrogram is a tree diagram frequently used to illustrate the arrangement of the clusters produced by hierarchical clustering. The child nodes of a parent node must be more substitutable than the child nodes of different parent nodes in the tree structure represented by the dendrogram. This CBT may act as a useful item grouping for item assortment and pricing decisions at a retail store.

Embodiments of the invention may provide a number of auto-naming methods to give appropriate summarized names for groups of products. The system can automatically use product descriptions and attributes of products related to the CBT nodes to find an appropriate name to represent a group of products. Further, the CBT helps the retailer to understand groups of similar products from the customer perspective and put them together.

The system creates a term-document matrix (DTM) using product description, attributes, and words. The document-term matrix is a mathematical matrix that describes the frequency of terms that occur in a collection of documents. In a document-term matrix, rows correspond to documents in the collection and columns correspond to terms.

The system identifies top frequency words in the term-document matrix and corpuses. The system may use one or more of methods with unsupervised text summarization for auto-naming the CBT nodes, such as N-gram frequency model, common theme topic model, overlapping topic model, TextRank algorithm, word vector model, and full text approach model. The system also selects top occurring words or n-grams which satisfy a certain frequency threshold as node names. Recall-Oriented Understudy for Gisting Evaluation (ROGUE) metric may be utilized to choose the best algorithm or method for auto-naming the CBT nodes. The system identifies top-occurring words/n-grams within each node to represent node names such that they satisfy certain frequency cut-off conditions. Additionally, the node names may be improved and updated by using semi-supervised co-training models to incorporate user feedback.

Figure 1:
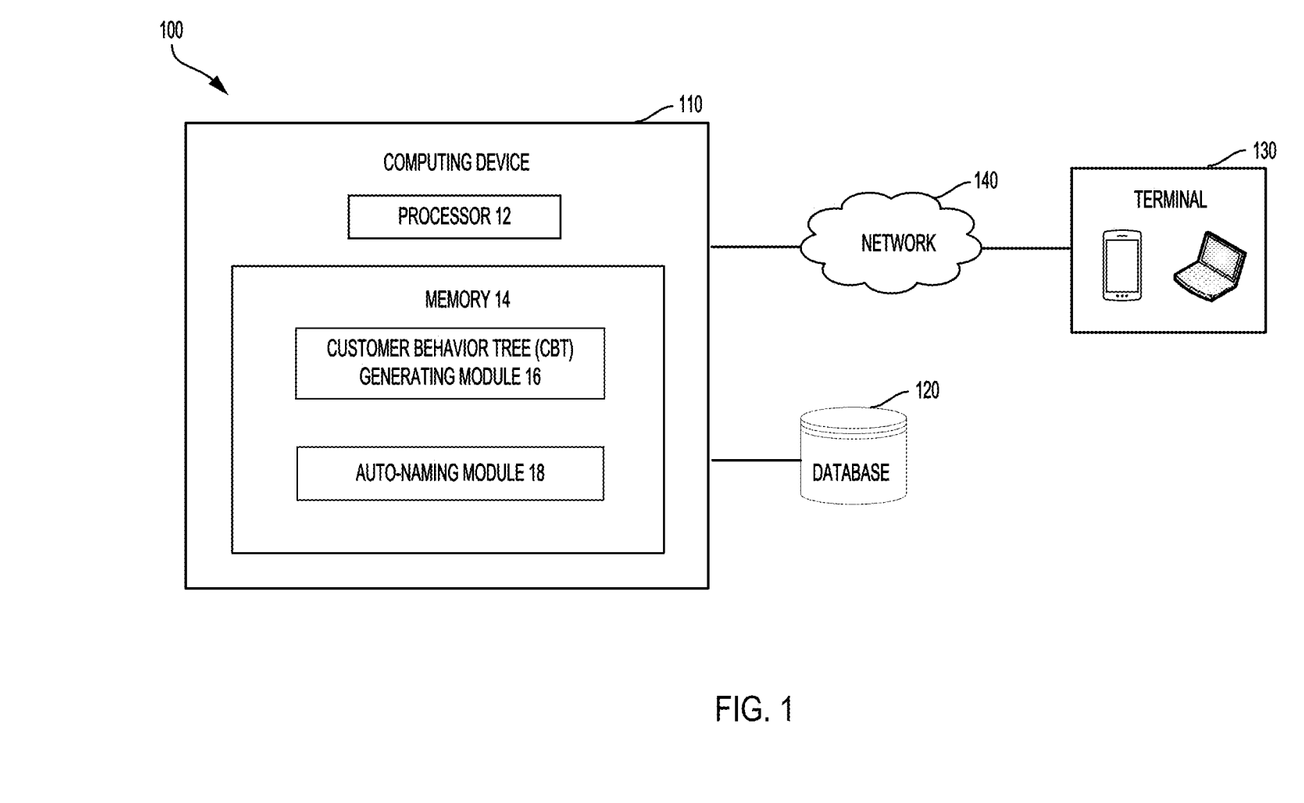
FIG. 1 is a block diagram illustrating an example computing system in which some example embodiments may be implemented.

FIG. 1 is a block diagram illustrating an example computing system 100 in which some example embodiments may be implemented. The example computing system 100 generally includes a computing device 110, a database 120, a terminal 130, and network 140.

The computing device 110 may be a local server or a computer terminal associated with a retailer. The computing device 110 may include processor 12 and memory 14. The memory 14 may store various CBT algorithm generating modules or executed instructions/applications to be executed by the processor 12.

The computing device 110 communicates with the database 120 to execute one or more sets of processes. The database 120 may be communicatively coupled to the computing device 110 to receive instructions or data from and send data to the computing device 110 via network 140. The customer historical sales data and item information may be stored in the database 120.

The terminal 130 may represent at least one of a portable device, a tablet computer, a notebook computer, or a desktop computer that allows the customer to communicate with the computing device 110 to access the CBT and perform online activities via network 140.

The network 140 may include satellite-based navigation system or a terrestrial wireless network, Wi-Fi, and other type of wired or wireless networks to facilitate communications between the various networks devices associated with example computing system 100.

The computing device 110 includes different functional or program modules which may be software modules or executive applications stored in the memory 14 and executed by the processor 12. The program modules include routines, programs, objects, components, and data structures that can perform particular tasks or implement particular data types. In some embodiments, the computing device 110 may include one or more processors to execute the various functional modules including a CBT generating module 16, and an auto-naming module 18.

The CBT generating module 16 may create a customer behavior tree (CBT) from the customer perspective. The hierarchy customer behavior tree (CBT) may include a plurality of levels of nodes with a root node and a plurality of child nodes. Each level of nodes may include child nodes descending from the root node or another child node. Each CBT node may represent a node name which may be a term or a phrase associated with the product descriptions and an attribute in a category.

The auto-naming module 18 may utilize a text analysis engine to implement different models or algorithms to perform auto-naming of the CBT nodes. The text analysis engine may be configured to identify relationships between items or words associated with the CBT nodes.

Figure 2:
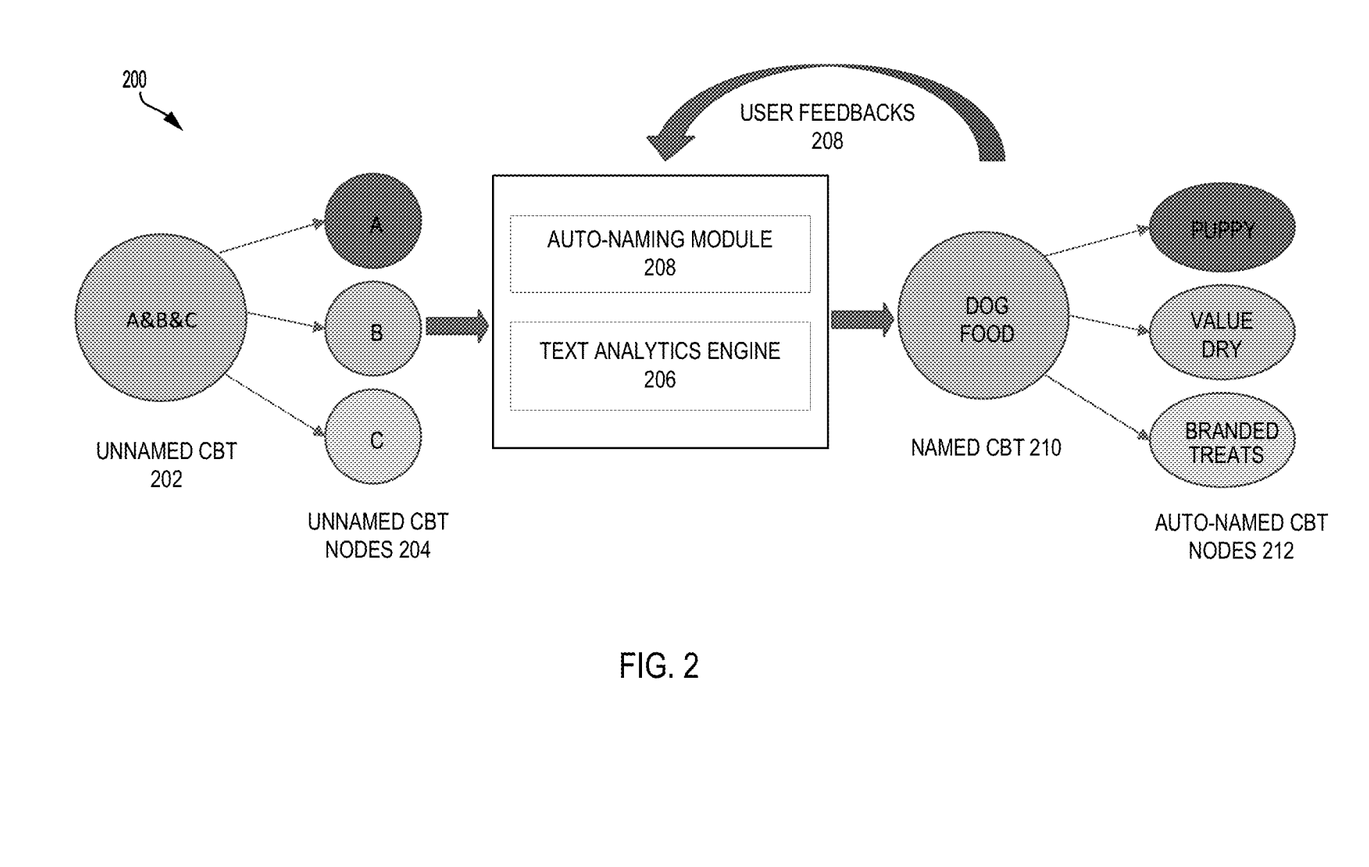
FIG. 2 is a block diagram illustrating an example auto-naming system in accordance with some example embodiments.

FIG. 2 is a block diagram illustrating an example auto-naming system 200 in accordance with some example embodiments. The auto-naming system 200 can include an unnamed CBT 202, an auto-naming module 18, a text analytics engine 206, user feedback 208, and a named CBT 210. The unnamed CBT 202 may include a plurality of unnamed CBT nodes 204 at a final level of the unnamed CBT 202. The named CBT 210 may include a plurality of auto-named CBT nodes 212 at a final level of the named CBT 210.

Figure 3:
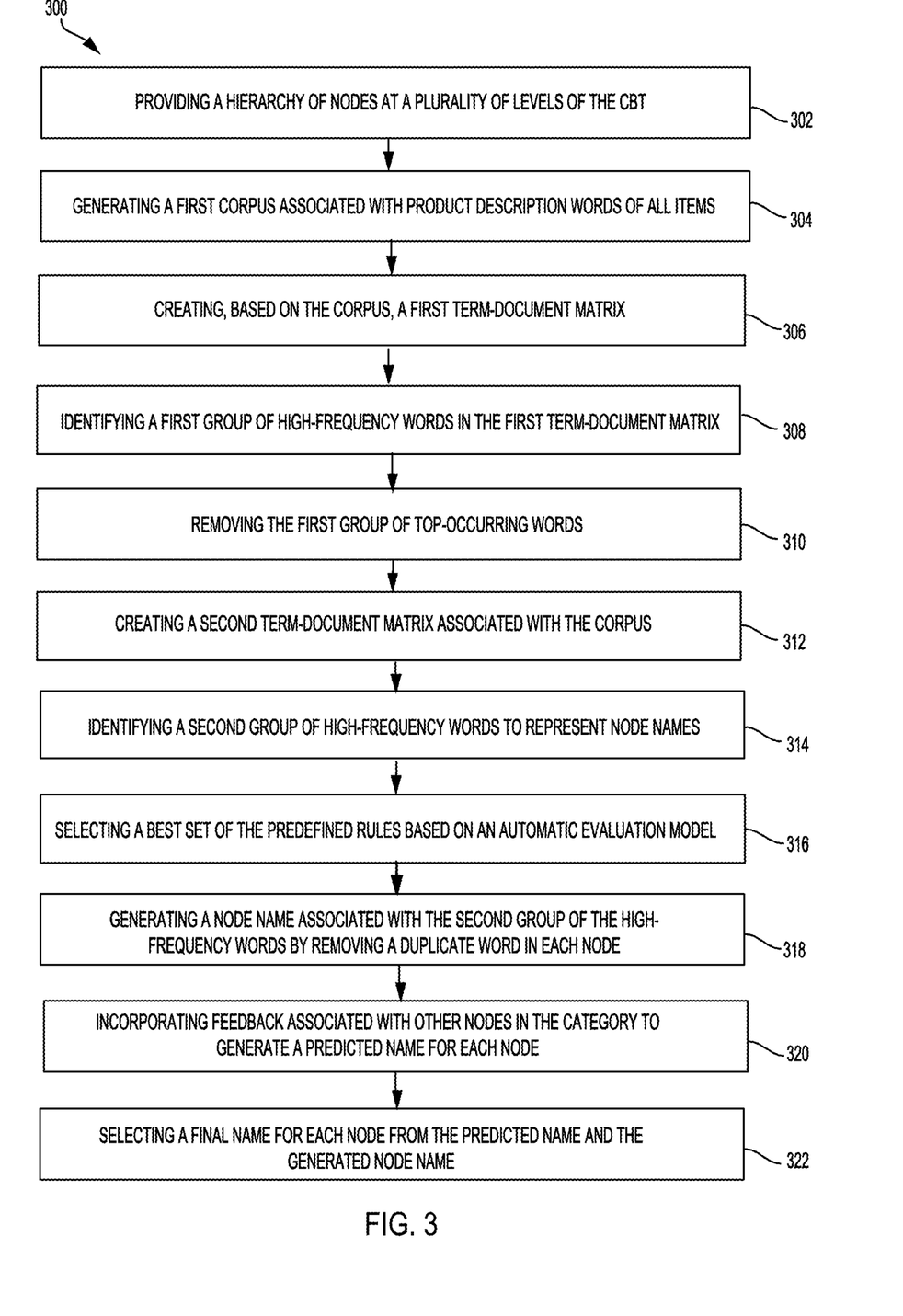
FIG. 3 is a flowchart diagram illustrating an example process for auto-naming customer behavior tree nodes in accordance with some embodiments.

FIG. 3 is a flowchart diagram illustrating an example process 300 for auto-naming customer behavior tree (CBT) nodes in accordance with some embodiments. The process 300 may be implemented in the above described systems and may include the following steps. Steps may be omitted, ordered, or combined depending on the operations being performed.

At step 302, a customer behavior tree (CBT) may be provided by a computing device and the CBT comprises with a hierarchy of nodes at a plurality of levels. A processor of the computing device may access the customer behavior tree for obtaining information associated with a hierarchy of nodes at a plurality of levels.

At step 304, for each node of a final level of the CBT, a corpus is created to include product descriptions of all items in a category and available attributes associated with the items. The product attributes may include brand, fineline, price, size, package, type, flavor, latent topics from product description, etc. Initial names of the CBT nodes may be based primarily on the product description and attributes to guide the user to interpret the CBT hierarchy. Each CBT node can include product description, brand, package, size, flavor, price, etc. Distinguishable product attributes may be used to enhance the node names. The corpus may be classified as a plain text document which includes a full collections of the product description of all items in the category and all available attributes associated with the items. In some embodiments, separate corpuses may be built for each node of the CBT based on the product descriptions and available attributes associated with the items in the category.

Referring to FIG. 2, the auto-naming system 200 may include a data pre-processing module configured to preform various data per-processing functions on the corpus, including stop-words removal, treating most common words in category, spelling correction, and abbreviation matching, etc. Additionally, the auto-naming system 200 may include the text analytics engine 206 configured to preform text analysis associated with a corpus, such as word frequency, latent topics, word vectors, semantics, spell-check, page rank, etc. At step 306, based on the corpus, a first term-document matrix is created and is associated with each word in the corpus. A frequency or the number of times of the word appearing in the corpus may be calculated based on the first term-document matrix. For example, the document-term matrix is a matrix A with documents designated by rows and terms by columns, and the elements of the DTM are the number of times a term appears in a document. For example, the term-document matrix A has values $a_{ij}$, where $a_{ij}$ is a function of the number of times the term i appears in a document j.

At step 308, a first group of high-frequency words are identified in the first term-document matrix and the corpus based on the information associated with all nodes. One embodiment is based on each node. One embodiment is to identify a first group of high-frequency words in the first term-document matrix by considering all nodes of the CBT. The first group of high-frequency words can be identified if they are commonly used for all different nodes in the hierarchy since they may not have different meanings for individual nodes. For example, the words of "dog" and "food" are usually used for the nodes in the category of dog food.

At step 310, the first group of high-frequency words are removed from the corpus in order to clean the corpus to obtain a second corpus. The first group of high-frequency words are removed so that they are not considered for naming each individual node. The first document-term matrix may be updated accordingly.

At step 312, a second term-document matrix is created with the second corpus based on a set of predefined rules. A value of the second term-document matrix is defined as a data set to represent a number of times each term appears in the second corpus. The set of the predefined rules comprises at least one of an n-gram frequency model, a common themes topic model, an overlapping topic model, a word vector representation model, and a full text approach model.

At step 314, based on a set of predefined rules corresponding to different algorithm models, a second group of high-frequency words are identified for the node names. The different algorithm models may utilize unsupervised text summarization for auto-naming the CBT nodes as described below. The times that the second group of high-frequency words appear in the second corpus need to satisfy a predefined frequency cut-off threshold. In some embodiments, the predefined frequency cut-off threshold is 90%. A particular node name may be determined for a node based on the second group of high-frequency words. Different nodes may contain the same particular word.

At step 316, the system may run an automatic evaluation model to evaluate the different algorithm models and select a best set of the predefined rules to generate a node name. By referring to FIG. 5, the processor may generate multiple node names for a node from the second group of high-frequency words using the different methods of as described below. The processor may use the Recall-Oriented Understudy for Gisting Evaluation (ROGUE) metric to choose the best method of unsupervised text summarization and select a generated node name for a node.

At step 318, a node name may be modified by removing a duplicate word from the node, based on a frequency ratio of the word in a node to all nodes in the category. To choose a name for each node to be distinguished from each other, the system may identify a particular common word shared by all the node names. For each node, the process may further compare a frequency ratio of the times the particular word appears in the product description of each node to a total number of times the particular word appears in the category. If the frequency ratio is greater than a certain frequency threshold, the system can decide which node is the best one to be assigned with the particular common word. The same particular word assigned to one node may be removed from the names of other nodes.

At step 320, a predicted node name may be generated by incorporating user feedback associated with other nodes in the category. In some embodiments, the user feedback may incorporate incremental learning about other nodes in the category and long-term learning about other markets and categories using a weightage based framework.

In one embodiment, the system may include a particular renaming tool which allows the customer to click the node and change the node name via a display screen of the computing device 110. For example, the particular renaming tool shows a CBT including 20 nodes with product description for each node. In one embodiment, a word may be moved from some nodes and be added to other nodes. The weight may be assigned the word added to the other nodes using the weightage based framework. A better frequency may be given to the word added to a node based on the associated corpus in order to identify the high-frequency words which are important for define the node name. Accordingly, a less weight may be given to a word which is removed from some nodes. The names of other nodes in the CBT may be updated based on these weighted factors related to the added and removed words.

At step 322, the processor may select a final name for each node from the predicted name associated with the user feedback and the generated node name associated with the second group of the high-frequency words generated with the set of predefined rules.

Figure 4:
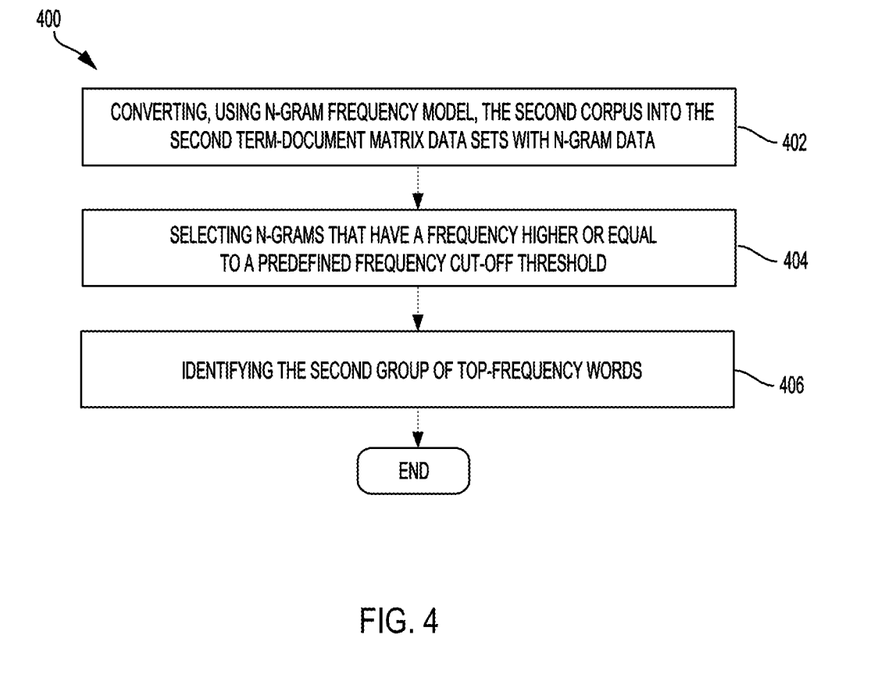
FIG. 4 is a flowchart diagram illustrating an example auto-naming process using n-gram frequency model in accordance with some embodiments.

FIG. 4 is a flowchart diagram illustrating an example auto-naming process 400 using n-gram frequency model in accordance with some embodiments. The process 400 may utilize the n-gram frequency model to identify top-occurring n-grams within each node.

At step 402, based on a set of predefined rules corresponding to the n-gram frequency model, the second corpus may be converted into the second term-document matrix with n-gram data. A value of the second term-document matrix may be defined as a data set to represent a number of times each term appears in the corpus. In one embodiment, four different tokenizer functions may be used to generate the 4-gram, trigram, bigram, and unigram sequences simultaneously. The corpuses may be augmented up to 4 n-gram sequences using n-gram tokenizer function in order of 4-gram, trigram, bigram, and unigram. A second term-document matrix is generated based on each of the augmented n-gram sequence. Frequencies or total times that each n-gram appears in the corpus can be obtained. For example, the second term-document matrix with 4-grams is created first based on the corpus generated for a node.

At step 404, the n-grams in an n-gram sequence that have frequency higher or equal to a predefined frequency cut-off threshold are selected by the n-gram frequency model. In one embodiment, the predefined frequency cut-off threshold is 90%.

At step 406, based on the selected n-grams, the second group of high-frequency words in the data set is identified to represent the node names such that the high-frequency words satisfy the predefined frequency cut-off threshold. The model may process an n-gram sequence in an order of 4-gram, trigram, bigram, and unigram. If the results based on 4-gram sequence are not satisfied with the predefined frequency cut-off threshold, a trigram sequence may be processed. The iteration process may be up to unigram until the system identifies n-grams which have frequency higher or equal to a predefined frequency cut-off threshold. The identified n-grams may form a second group of high-frequency words to represent node names. The second group of high-frequency words may be further processed with other steps in the process 300 and the process 400.

In some embodiments, a common themes topic model can be used for auto-naming the CBT nodes. By following the steps at the steps of 304, 306, 308, and 310 of the process 300, the same second term-document matrix and the related second corpus are created to comprise the product description words. The common themes topic model can use the same second term-document matrix and the related second corpus.

Based on the common themes topic model, infrequent words with extreme sparsity more than 99% can be found and removed from the corpus. The common themes topic model uses Latent Dirichlet Allocation (LDA) model with Gibbs sampling to identify top 10 topics or clusters within each node bases on the corpus. LDA model may generate a mixture topics based on word frequency from the corpus. LDA model is particularly useful for finding reasonably accurate mixtures of topics within the corpus. Each cluster may represent different attributes or aspects of a particular node. Each topic or cluster may represent a group of 10 words based on their frequencies in the given corpus.

Using the common themes topic model, the high-frequency common words may appear in all of 10 clusters and be chosen across the different clusters to get central overlapping word/theme with the particular node for naming the node. The high-frequency common words may be further processed with other steps in the process 300 and the process 400.

In some embodiments, an overlapping topic model can be used for auto-naming the CBT nodes. The overlapping topic model is different from common themes topic model described above since the overlapping topic model CBT does not consider the hierarchy of nodes of the CBT itself. The overlapping topic model CBT considers all product description and attributes in the category and creates a cluster of items. As described in the process 300, the first term-document matrix and the related first corpuses are created to include all product description and attributes by following the same process steps at the steps 304 and 306 of the process 300. The overlapping topic model can use the same first term-document matrix and the related first corpuses.

Based on overlapping topic model, infrequent words with extreme sparsity more than 99% can be found and removed from the first corpus. LDA model may be applied to the corpus with Gibbs sampling to generate a number of topics equal to the number of nodes on the final level of the CBT. For example, the CBT has 20 nodes on the final level of the CBT. LDA model may be applied to the corpus with Gibbs sampling to generate 20 topics with clusters based on word frequency from the first corpus. Each topic or cluster may represent a group of words based on their frequencies in the given corpus. For each node, the topics generated using the overlapping topic model and the topics generated common themes topic model may be overlapped to decide which topic model is a more suitable tool. By selecting a more suitable tool from the overlapping topic model and the common themes topic model, common words obtained by the suitable tool can be determined and the words having the highest allocation probability may be considered as high-frequency words for a node. The high-frequency common words may be further processed with other steps in the process 300 and the process 400.

In one embodiment, the generated topics using the overlapping topic model may not be properly distributed across the nodes. Thus, the common themes topic model may be more important than overlapping topic model for auto-naming the CBT.

In some embodiments, a model of word vector representation can be used for auto-naming the CBT nodes. Each word appears in the product description and attributes.

In one embodiment, a word-2-vec model may be trained on the roll-up ID description of the n-gram sequence (bundled up to 4-grams) with window-size 12, 5 iterations, and 4 threads to create 200-dimention vectors. Roll-up ID description denotes a description of synonyms items. The n-grams occurring in a particular node may be selected and a centroid of these vector representations may be computed. The words closest to the centroid of the node may be selected as the node name.

The model of word vector representation may potentially be used to train the proposed names given by the customer, so that the model can learn the naming convention and suggest more appropriate names in a proposed situation. There is a scope of cross-category learning and previous naming exercise can be leveraged.

In some embodiments, a graph-based model of TextRank algorithm is used for auto-naming the CBT nodes. TextRank algorithm is an application of Google's PageRank algorithm. In one embodiment, the model of TextRank algorithm may consider words or sentences as pages on the PageRank giving higher ranks or importance to certain words or sentences with stronger links. In some embodiments, Python's 'gensim' is used to apply TextRank algorithm for auto-naming the CBT nodes.

The TextRank algorithm may take roll-up ID description and important attributes including fineline description, brand name, brand type, weight description to create one additional variable pack size from a pack number to detect multipack and single-pack items and concatenate all the information together to create the final node name.

The TextRank algorithm may select texts based on an assumption that more important words are likely to receive more links from other words.

In some embodiments, a full text approach model based on document term frequency can be used for auto-naming the CBT nodes by following the steps illustrated below.
1) A 'full text' field is generated by concatenating roll-up ID description of the product, fineline description and price bucket information of a product. The description of multiple items are grouped together to form fineline description. The corpus is generated to include the information of 'full text' field combined with all product description.
2) The data pre-processing for the corpus is conducted by removing stop words (e.g., the, of, an etc.) and removing stemming to reduce different grammatical forms/ word forms of a word to its root form. One example of stemming is remove a word suffix (e.g., 'ed' or 'able') to obtain the root word.
3) A document term frequency matrix is generated using count vectorizer where each roll-up ID's corresponding full text is treated as a separate document.
4) A high term frequency of a term does not necessarily reflect the term significance. The document term frequency matrix needs to be transformed to a matrix to show term significant. The term frequency is normalized by dividing the term frequency by the total number of documents to obtain the relevance. Each term frequency in the document term frequency matrix is transformed into a significant number of the document term. Top significant terms can be chosen as node words or title words for a node by following some procedures. First, a normalized frequency above a certain threshold of 0.8 is set as a starting threshold. Second, the threshold of a normalized frequency is adjusted up to 0.9 and/or then the system manually lowers the threshold in order to obtain top significant terms or words for the node.

Further, some additional rules may be applied to name the node. A brand of an item is not considered in the full text approach model associated with roll-up ID description of the product, fineline description and price bucket information. In one embodiment, there are multiple brands in a column of "brand" or in a node where many items have different brands. A term of 'Branded' may be concatenated to the title of the items. Therefore, item brand may not be considered in the corpus during the auto-naming process.

Figure 5:
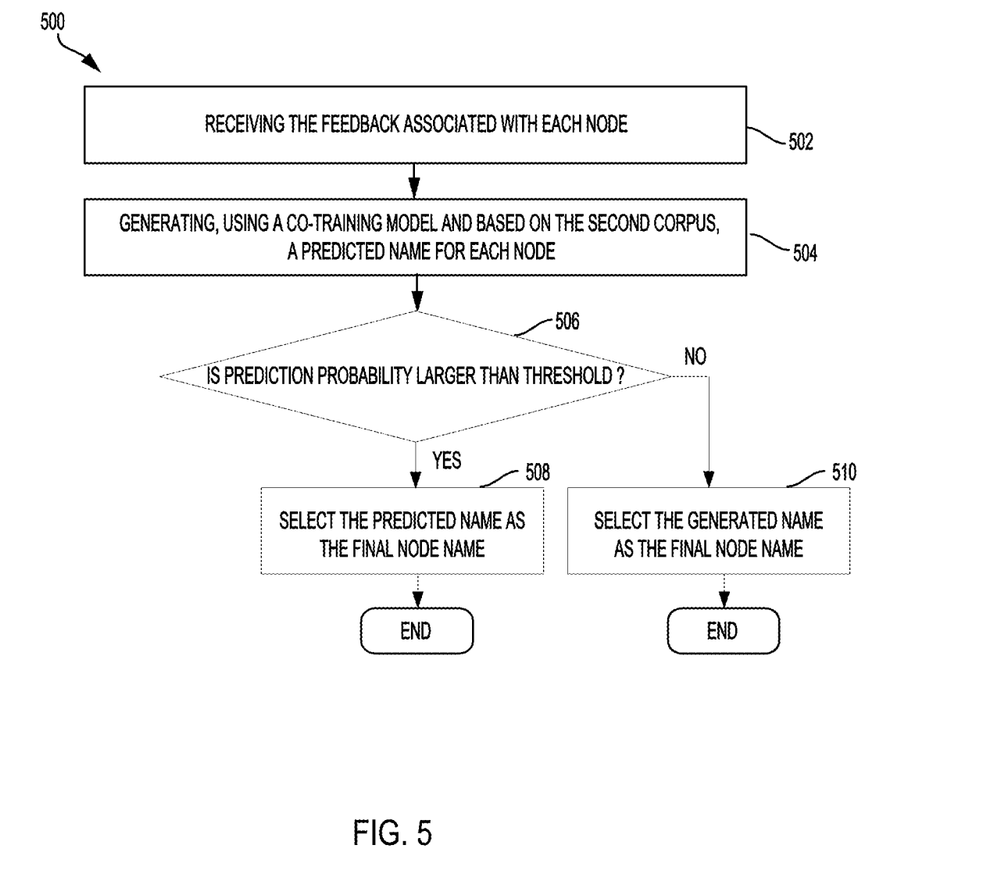
FIG. 5 is a flowchart diagram illustrating an example process of incorporating user feedback for selecting node names in accordance with some embodiments.

FIG. 5 is a flowchart diagram illustrating an example process 500 of incorporating user feedback for selecting proper node names in accordance with some embodiments. The semi-supervised co-training models may be used to capture and incorporate user feedback for updating and improving the node names.

At step 502, the processor of the computing device may receive the user feedback associated with each node of the final level of the CBT nodes. The user feedback may be received by the processor via a display screen of the computing device. As will be described in more detail below, the processor may analyze the user feedback and identify important features of items and words associated with each node for naming the node.

At step 504, a co-training machine learning model may be used to generate a predicted name for each node of the final level of the CBT. The co-training machine learning model with cross-validation is a semi-supervised learning algorithm and may be used to classify the obtained second group of the high-frequency words to decide the words to be include in a node name or not. The processor may obtain a small portion of the node name data of the final level of the CBT nodes as labeled data. The small portion of the labeled data is associated with the node names with user feedback. There is a large portion of unlabeled data associated with the final level of the CBT nodes. Two learning models are trained on both labeled and unlabeled data. In each iteration, the co-training algorithm selects high confidence data scored by both models to form an auto-labeled dataset. The high confident predictions of each model on the unlabeled data are then used to iteratively construct additional labeled training data. The co-training machine learning model may be further used to predict the node name for each node. The processor may calculate a prediction probability of the predicted name.

At step 506, the processor may automatically compare the prediction probability of the predicted name with a predefined prediction threshold for selecting a final name for the node. In some embodiments, the processor may generate multiple node names for a node from the second group of high-frequency words using the different methods of unsupervised text summarization as described above. The processor may use the Recall-Oriented Understudy for Gisting Evaluation (ROGUE) metric to choose the best method of unsupervised text summarization and select a generated node name for a node.

At step 508, the processor may select the predicted name as the final node name when a prediction probability of the predicted name is larger than the predefined prediction threshold. Otherwise, at step 510, when a prediction probability of the predicted name is equal to or smaller than the predefined prediction threshold, the processor may choose a generated node name with a method of unsupervised text summarization as the final node name. The predefined prediction threshold may be dynamically adjusted by evaluating the final name of the node such that best suitable final names are provided to the CBT nodes.

Figure 6:
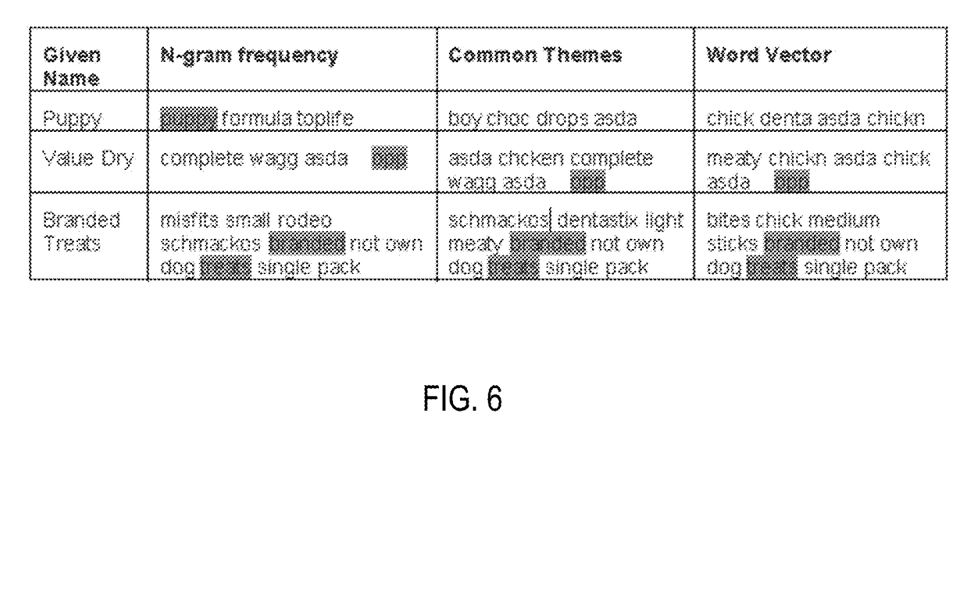
FIG. 6 is a table showing some example node names generated by auto-naming methods with unsupervised text summarization and corresponding final given node names in accordance with some embodiments.

FIG. 6 is a table showing some example node names generated by various auto-naming methods with unsupervised text summarization and corresponding final given node names. Referring to FIG. 2, the category of "Dog food" may include 3 nodes of the final level of CBT nodes. The final give node names may be "puppy", "value dry" and "branded treats".

Figure 7:
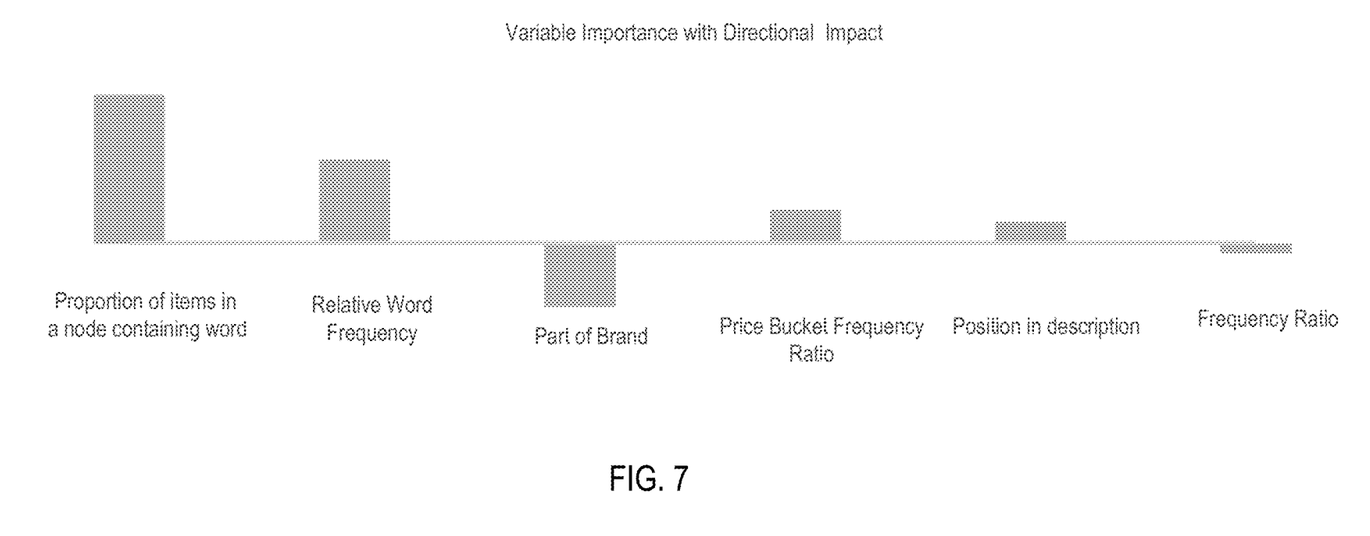
FIG. 7 is an example diagram illustrating different variable impacts on auto-naming the CBT nodes in accordance with some embodiments.

FIG. 7 is an example diagram illustrating different variable impacts during the process of auto-naming the CBT nodes. In some embodiments, the system may analyze how the user changes the node names by evaluating relative importance of a variable impact on naming the nodes. The system may analyze the user feedback and identify multiple useful features in the user feedback. The useful features may include location, frequency, context and performance associated with the items and the words associated with the CBT nodes. Each feature may include multiple variables associated with the items and words related to a particular CBT nodes. For example, the location related features can include first word of a node, first word of an item, position in product description, position in full description, and position of first item containing the word. The frequency related features can include frequency within node overall frequency, frequency ratio, part of attribute, frequency ratio of word within all attributes, and item attributes. The context related features can include a character length ratio within a node, part of English dictionary, highest string similarity to any word in a node, highest string similarity to any word in a category, average similarity with all the items in the node, ratio of items in the node containing the word, ratio of items in the category containing the word, and node to category ratio of containing words. The performance related features can include store count ratio of all items containing the word, mean Units sold Per Store Per Week (UPSPW) of all items containing the word, and mean penetration of all items containing the word. For example, referring to FIG. 7, the variables associated with the user feedback may include a proportion of items in a node containing words and relative word frequency which have direct and important impact on naming the CBT nodes.

Figure 8:
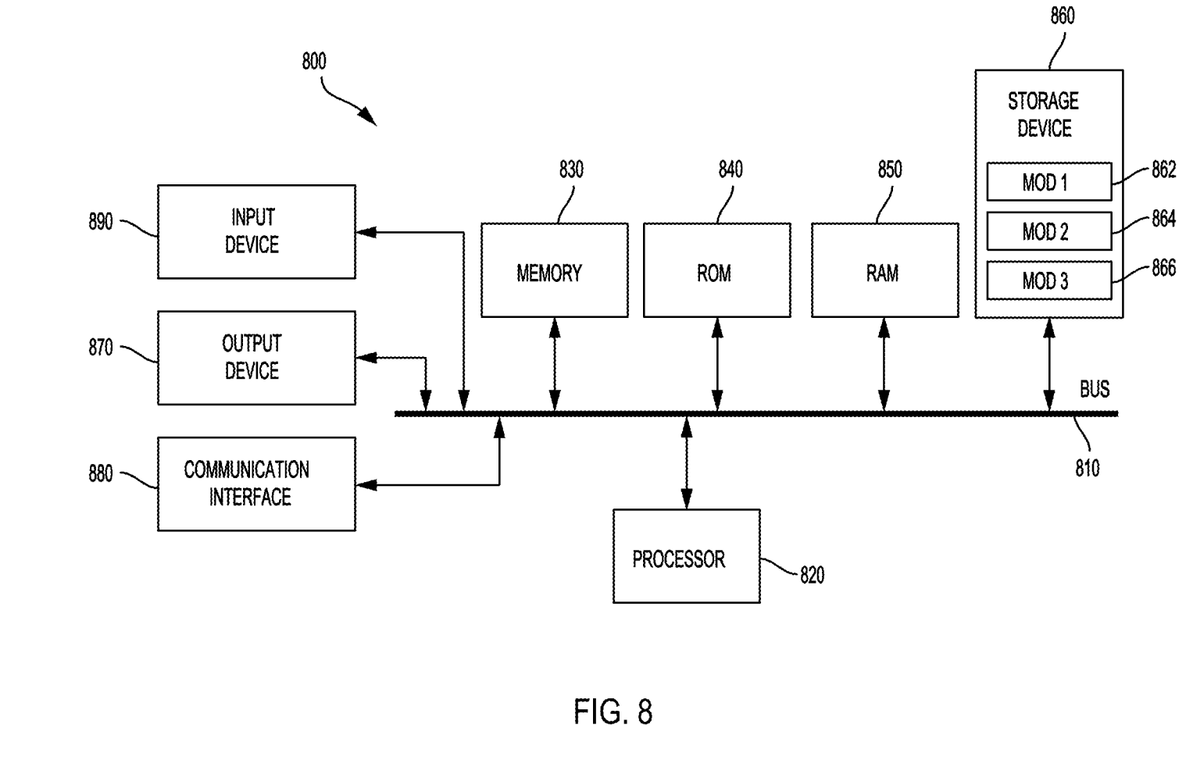
FIG. 8 is a block diagram illustrating an example computer system in which some example embodiments may be implemented.

FIG. 8 illustrates an example computer system 800, which may be used to implement embodiments as disclosed herein. The computing system 800 may be a server, a personal computer (PC), or another type of computing device.

The exemplary system 800 can include a processing unit (CPU or processor) 820 and a system bus 810 that couples various system components including the system memory 830 such as read only memory (ROM) 840 and random access memory (RAM) 850 to the processor 820. The system 800 can include a cache of high speed memory connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, bus 810, display 870, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 800 is a small, handheld computing device, a desktop computer, or a computer server.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A computer-implemented method for auto-naming customer behavior tree (CBT) nodes, comprising:
   providing, by a computing device, a hierarchy of nodes at a plurality of levels of the CBT;
   generating, by a processor, a first corpus comprising product description of all items in a category and product attributes for each node of a final level of the CBT;
   creating, based on the first corpus, a first term-document matrix associated with each word in the first corpus and a frequency that the word appears in the first corpus;
   identifying a first group of high-frequency words in the first term-document matrix;
   removing the first group of the high-frequency words from the first corpus to obtain a second corpus;
   creating a second term-document matrix associated with the second corpus based on each of a set of predefined rules, a value of the second term-document matrix being defined as a data set to represent a number of times each word appears in the second corpus, the set of the predefined rules comprising at least one of an n-gram frequency model, a common themes topic model, an overlapping topic model, a word vector representation model, and a full text approach model;
   identifying, based on a data set of the second term-document matrix, a second group of high-frequency words to represent node names such that the second group of the high-frequency words satisfy a predefined frequency cut-off threshold;
   selecting, by the processor, a best set of the predefined rules based on an automatic evaluation model;
   generating a node name associated with the second group of the high-frequency words by removing a duplicate word in each node, using the best set of the predefined rules and based on a frequency ratio of each word in each node to all the nodes;
   incorporating feedback associated with other nodes in the category to generate a predicted name for each node; and
   selecting a final name for each node from the predicted name and the generated node name associated with the second group of the high-frequency words.

2. The method of claim 1, wherein the attributes comprise brand, fineline, price bucket, latent topics from product description, size and case package.

3. The method of claim 1, wherein, based on the n-gram frequency model, the set of predefined rules comprises:
   converting, using the n-gram frequency model with an n-gram tokenizer, the second corpus into the data set of an n-gram sequence, wherein an n-gram sequence comprises at least one of 4-gram, trigram, bigram, and unigram;
   selecting, by the n-gram frequency model, n-grams that have a frequency higher or equal to a predefined frequency cut-off threshold; and
   identifying, based on the selecting, the second group of high-frequency words in the data set to represent the node names such that the high-frequency words satisfy the predefined frequency cut-off threshold.

4. The method of claim 1, wherein the first group of high-frequency words is commonly used for all nodes in the hierarchy and the predefined frequency cut-off threshold is 90%.

5. The method of claim 1, wherein, based on the common themes topic model, the set of predefined rules comprises:
   removing infrequent words with extreme sparsity more than 99% from the second term-document matrix associated with the second corpus;
   obtaining 10 clusters for a node by applying with Latent Dirichlet Allocation model and Gibbs sampling; and
   choosing top-occurring common words across different clusters to get a central overlapping word for the node.

6. The method of claim 1, wherein, based on the overlapping topic model, the set of predefined rules comprises:
   removing words with extreme sparsity more than 99% from the first term-document matrix associated with the first corpus;
   obtaining clusters for all nodes of the final level of CBT by applying with Latent Dirichlet Allocation model with Gibbs sampling, a number of the cluster being equal to the number of the nodes of the final level; and
   assigning each node of the final level of CBT with a word of a highest allocation probability.

7. The method of claim 1, wherein, based on the word vector representation model, the set of predefined rules comprises:
   obtaining a data set of n-gram sequence on a rollup description of a node with window-size 12, 5 iterations, and 4 threads to create 200-dimention vectors, wherein the n-gram sequence comprises at least one of 4-gram, trigram, bigram, and unigram;

selecting the data set of the n-gram sequence occurring in a particular node and calculating a centroid of these vector representations; and selecting the words closest to a centroid of the node as a name of the node.

8. The method of claim 1, wherein, based on a graph-based model, the set of predefined rules comprises:

importing roll-up ID description and important attributes comprising fineline description, brand Name, brand type, and weight description;

creating one additional variable from a pack number to detect multipack and single-pack items and concatenating information together to create a final data; and selecting a word for a node which receives more links thank other words.

9. The method of claim 1, wherein, based on a full text approach model, the set of predefined rules comprises:

generating a corpus by concatenating roll up ID description, fineline description, and price bucket;

removing stop words and stemming from the corpus;

generating a document term frequency matrix using count vectorizer where a corresponding full text of each rollup ID is treated as a separate document;

normalizing the frequency by dividing a word frequency by a total number of documents to obtain a relevance; and selecting words with a normalized frequency above a certain threshold of 0.8 to be title words.

10. The method of claim 1, wherein the incorporating the feedback further comprises:

receiving, via a display screen, the feedback associated with each node of the final level of the CBT;

generating, using a co-training model and based on the second group of high-frequency words, the predicted name for each node;

comparing a prediction probability of the predicted name to a predefined prediction threshold for selecting the final name for each node; and when the prediction probability of the predicted name is larger than predefined prediction threshold, selecting the predicted name as the final name for the node.

11. A system for auto-naming customer behavior tree (CBT) nodes, comprising:

a processor of a computing device; and a computer program product comprising a non-transitory computer-readable storage medium having instructions stored which, when executed by the processor, cause the processor to perform operations comprising:

providing, by a computing device, a hierarchy of nodes at a plurality of levels of the CBT;

generating a first corpus comprising product descriptions of all items in a category and product attributes for each node of a final level of the CBT;

creating, based on the first corpus, a first term-document matrix associated with each word in the first corpus and a frequency that the word appears in the first corpus;

identifying a first group of high-frequency words in the first term-document matrix;

removing the first group of the high-frequency words, the first corpus to obtain a second corpus;

creating a second term-document matrix associated with the second corpus based on each of a set of predefined rules, a value of the second term-document matrix being defined as a data set to represent a number of times each word appears in the second corpus, the set of predefined rules comprising at least one of an n-gram frequency model, a common themes topic model, an overlapping topic model, a word vector representation model, and a full text approach model;

identifying, based on a data set of the second term-document matrix, a second group of high-frequency words to represent node names such that the second group of the high-frequency words satisfy a predefined frequency cut-off threshold;

choosing a best set of the predefined rules based on an automatic evaluation model;

generating a node name associated with the second group of the high-frequency words by removing a duplicate word in each node, based on a frequency ratio of each word in each node to all the nodes;

incorporating feedback associated with the nodes in the category to generate a predicted name for each node; and selecting a final name for each node from the predicted name and the generated node name associated with the second group of the high-frequency words.

12. The system of claim 11, wherein the attributes comprise brand, fineline, price bucket, latent topics from product description, size and case packs.

13. The system of claim 11, wherein, based on the n-gram frequency model, the set of predefined rules comprises:

converting, using the n-gram frequency model with an n-gram tokenizer, the second corpus into the data sets of an n-gram sequence, wherein an n-gram sequence comprises at least one of 4-gram, trigram, bigram, and unigram;

selecting, by the n-gram frequency model, n-grams that have a frequency higher or equal to a predefined frequency cut-off threshold; and identifying, based on the selecting, the second group of high-frequency words in the data set to represent the node names such that the high-frequency words satisfy the predefined frequency cut-off threshold.

14. The system of claim 11, wherein the first group of high-frequency words is commonly used for all nodes in the hierarchy and the predefined frequency cut-off threshold is 90%.

15. The system of claim 11, wherein, based on the common themes topic model, the set of predefined rules comprises:

removing infrequent words with extreme sparsity more than 99% from the second term-document matrix associated with the second corpus;

obtaining 10 clusters for a node by applying with Latent Dirichlet Allocation model and Gibbs sampling; and choosing top-occurring common words across different clusters to get a central overlapping word for the node.

16. The system of claim 11, wherein, based on the overlapping topic model, the set of predefined rules comprises:

removing words with extreme sparsity more than 99% from the first term-document matrix associated with the first corpus;

obtaining clusters for all nodes of the final level of CBT by applying with Latent Dirichlet Allocation model with Gibbs sampling, a number of the cluster being equal to the number of the nodes of the final level; and assigning each node of the final level of CBT with a word of a highest allocation probability.

17. The system of claim 11, wherein, based on the word vector representation model, the set of predefined rules comprises:

obtaining a data set of n-gram sequence on a rollup description of a node with window-size 12, 5 iterations, and 4 threads to create 200-dimention vectors, wherein the n-gram sequence comprises at least one of 4-gram, trigram, bigram, and unigram;

selecting the data set of the n-gram sequence occurring in a particular node and calculating a centroid of these vector representations; and selecting the words closest to a centroid of the node as a name of the node.

18. The system of claim 11, wherein, based on a graph-based model, the set of predefined rules comprises:

importing rollup ID description and important attributes comprising fineline description, brand Name, brand type, and weight description;

creating one additional variable from a pack number to detect multipack and single-pack items and concatenating together to create a final data; and selecting a word for a node which receives more links thank other words.

19. The system of claim 11, wherein, based on the full text approach model, the set of predefined rules comprises:

generating a corpus by concatenating roll-up ID description, fineline description, and price bucket;

removing stop words and stemming from the corpus;

generating a document term frequency matrix using count vectorizer where a corresponding full text of each roll-up ID is treated as a separate document; and normalizing the frequency by dividing a word frequency by a total number of documents to obtain a relevance; and selecting words with a normalized frequency above a certain threshold of 0.8 to be title words.

20. The system of claim 11, wherein the incorporating the feedback further comprises:

receiving, via a display screen, the feedback associated with each node of the final level of the CBT;

generating, using a co-training model and based on the second group of high-frequency words, the predicted name for each node;

comparing a prediction probability of the predicted name with a predefined prediction threshold for selecting the final name for each node; and when the prediction probability of the predicted name is larger than predefined prediction threshold, selecting the predicted name as the final name for the node.

* * * * *